United States Patent [19]  [11] 4,407,988
Abrahams et al.  [45] Oct. 4, 1983

[54] METHOD FOR PREPARING A WEAR-RESISTANT COMPOSITION CONTAINING FLUORINATED GRAPHITE, GRAPHITE FIBERS AND PTFE

[75] Inventors: Louis Abrahams, Worcester; Thomas P. J. Izod, Holliston, both of Mass.

[73] Assignee: Millipore Corporation, Bedford, Mass.

[21] Appl. No.: 361,700

[22] Filed: Mar. 25, 1982

Related U.S. Application Data

[62] Division of Ser. No. 181,909, Aug. 27, 1980, Pat. No. 4,342,679.

[51] Int. Cl.³ ............................ C08K 7/02; C08K 3/04
[52] U.S. Cl. .................................. 523/334; 523/333; 524/401; 524/526; 264/117; 264/127
[58] Field of Search ................ 524/401, 546; 523/333, 523/334; 264/117, 127

[56] References Cited

U.S. PATENT DOCUMENTS

| | | | |
|---|---|---|---|
| 3,152,201 | 10/1964 | Kumnick | 264/127 |
| 3,756,925 | 9/1973 | Takevchi et al. | 204/16 |
| 3,911,072 | 10/1975 | Saito et al. | 264/117 |
| 4,050,701 | 9/1977 | Webb | 277/125 |
| 4,080,233 | 3/1978 | McCloskey et al. | 156/212 |
| 4,143,110 | 3/1979 | Morozumi et al. | 264/127 |
| 4,216,265 | 8/1980 | Sulzbach | 264/127 |
| 4,333,977 | 6/1982 | Abrahams et al. | 524/546 |
| 4,342,679 | 8/1982 | Abrahams et al. | 524/546 |

OTHER PUBLICATIONS

Derwent Abst. 11435 T/07 (JA7205418) 2-16-1972, "Tetrafluoroethylene Resin Comp. . . ."
Derwent Abst. 80866Y/45 (SU-528319) 12-3-1976, "Wear Resistant Self Lubucating Polymer. . . ."

*Primary Examiner*—Melvyn L. Marquis
*Assistant Examiner*—Herbert J. Lilling
*Attorney, Agent, or Firm*—Andrew T. Karnakis; Paul J. Cook; David Prashker

[57] ABSTRACT

A composition suitable for manufacturing into wear-resistant and chemically-inert articles, the composition being a mixture of 74 to 84% polytetrafluoroethylene, 7–17% graphite fibers, and 4–14% fluorinated graphite.

12 Claims, 2 Drawing Figures

METHOD FOR PREPARING A WEAR-RESISTANT COMPOSITION CONTAINING FLUORINATED GRAPHITE, GRAPHITE FIBERS AND PTFE

This application is a division of application Ser. No. 181,909, filed Aug. 27, 1980, now U.S. Pat. No. 4,342,679.

FIELD OF THE INVENTION

This invention relates to polytetrafluoroethylene based compositions suitable for use in manufacturing wear-resistant and chemically-inert articles.

BACKGROUND OF THE INVENTION

The use of polytetrafluoroethylene (PTFE) with fillers is known in the manufacture of seals, bearings, and like articles, all of which have a working surface that rubs against another surface moving relative thereto.

For example, a liquid chromatography pump manufactured by Waters Associates, Inc. (and described in copending application Ser. No. 10,686), currently uses a seal composed of PTFE filled with glass fibers. It is also known to make bearings from PTFE filled with fluorinated graphite.

SUMMARY OF THE INVENTION

It has been discovered that a mixture of 74–84% by weight polytetrafluoroethylene, 7–17% graphite fibers, and 4–14% fluorinated graphite can be used in manufacturing chemically-inert articles having significantly improved wear resistance. In preferred embodiments the mixture consists of about 79% polytetrafluoroethylene, 12% graphite fibers, and 9% fluorinated graphite; the empirically derived formula is approximately $CF_{1.3}$; and said composition has been sintered. A particularly advantageous application of the invention is to mold and sinter the composition into a seal for a high-pressure pump for liquid chromatography, particularly a pump of the kind described in Ser. No. 10,686 wherein a small diameter (e.g., ⅛ inch) plunger is relatively rapidly reciprocated.

In another aspect the invention features a method of making the composition, including the steps of mixing a polytetrafluoroethylene in chlorinated methane or ethane slurry, mixing a graphite fiber and fluorinated graphite in chlorinated methane or ethane slurry, mixing the two slurries together, and draining the combination slurry so as to give it a granular consistency. In preferred embodiments the combination slurry is mixed in water, drained, dried and sintered; the final mixture is passed through a #10 sieve and then a #14 sieve prior to sintering; the chlorinated methane or ethane used is methylene chloride; the combination methylene chloride slurry is drained at room temperature using a vacuum; the water slurry is drained and then dried at about 125° C.; the polytetrafluoroethylene slurry is mixed for about 1 minute; the fluorinated graphite and graphite fiber slurry is mixed for about one minute; the combination slurry is mixed for about 1½ minutes; the combination water slurry is mixed by three high-speed pulses; and water is removed from the combination slurry by draining and then by heating for about eight hours.

PREFERRED EMBODIMENT

The structure and manufacture of a preferred composition embodying the invention will now be described along with the structure, manufacture and use of a seal made from the composition, after first briefly describing the drawings.

DRAWINGS

STRUCTURE

Figure 1:
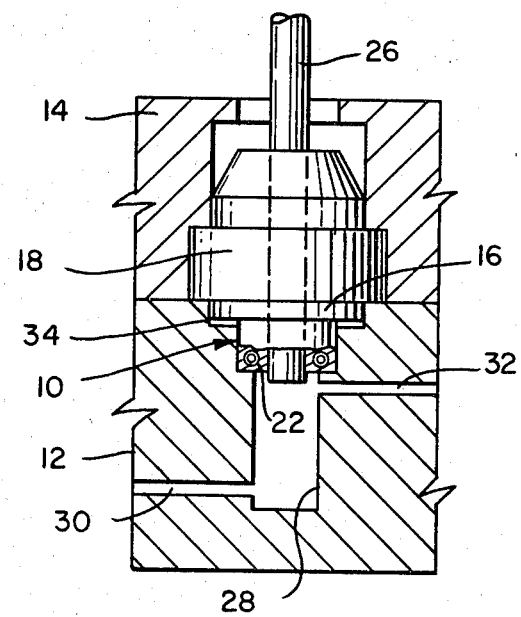
FIG. 1 is a sectional view of a seal made from a composition according to the invention and installed in a pump.
Figure 2:
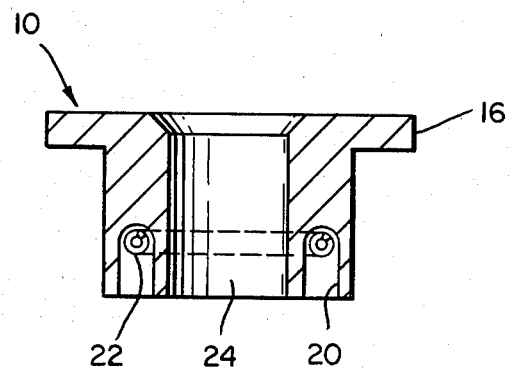
FIG. 2 is a sectional view of said seal prior to sintering.

Referring to FIGS. 1 and 2, there is shown self-lubricating seal 10 clamped between head 12 and mounting plate 14 of a pump for chromatography. The pump is described in copending U.S. application Ser. No. 10,686 (hereby incorporated by reference). Seal 10 has sealing bore 24, flange 16 (clamped against bushing 18), and a conventional helical endless spring 22 embedded in the pressurized end of the seal. Ceramic plunger 26 (⅛ inch diameter and lapped with diamond powder to a roughness of 10 microinches rms) is slidably mounted through bushing 18 and seal 10. The plunger travels in pumping bore 28, having inlet passage 30 and outlet passage 32 connected thereto. A thin teflon washer 34 is placed between flange 16 and head 12 to improve the seal between the head and seal 10.

MANUFACTURE

A homogeneous, fine and granular mixture suitable for molding and sintering into a wear-resistant article is first prepared. Fifty-two grams of PTFE (No. 8 granules available from DuPont) are mixed in a blender with approximately 170 ml methylene chloride at a high speed for one minute to form a slurry. Next eight grams of graphite fibers (approximately 0.04 inches long and 0.001 inches in diameter, from Union Carbide), and six grams of fluorinated graphite (approximately 40% fluorine and 60% carbon, from Air Products) are mixed with approximately 130 ml methylene chloride to form a slurry, and this second slurry is then added to the first and mixed in the blender for 1½ minutes at a high speed. The resulting slurry is then dried on filter paper inserted in a funnel attached to a vacuum source. It is important to achieve a granular mixture and avoid the formation of a cake which might result if the vacuum is applied to the mixture after removal of solvent. Thus, just as the last drops appear to be forming, the vacuum is disconnected. This drained mixture is then placed in the blender with approximately 200 ml R.O. (i.e., reverse osmosis) water, three short high speed blending pulses are applied (the motor's rotation being stopped between each pulse), and the resulting lumpy mixture is placed in a collander to allow draining of the bulk water. The mixture is then placed on aluminum foil and excess water is allowed to run off prior to drying the mixture for approximately eight hours in an oven at 125° C. The resulting dry and granular mixture is passed through #10 sieves and then through #14 sieves to break up the lumps. The sieves are agitated to promote passage of the mixture particles, but there is no mashing to avoid crushing them. This sieved material is now suitable for storage in plastic bags and/or molding and sintering.

The seal 10 is formed by pouring the sieved material into a mold, and compacting the material to the shape shown in FIG. 2, all by techniques well known in the art, such as disclosed in *Mechanical Design Data E/05561*, DuPont (1961) and *The Moulding of PTFE*

*Granular Powders*, Technical Service Note F-1 (2nd Ed.), The Moulding Powders Group, Plastics Division, Imperial Chemical Industries, Ltd., Hartfordshire, England (June 1973), both hereby incorporated by reference.

The compacted and molded article is placed into a sintering mold of the same dimensions as the first mold, and spring 22 is placed into annular groove 20. The surface of the sintering mold corresponding to bore 24 of the seal is polished to at least 16 microinches rms to impart the same smoothness to the bore. The mold maintains the shape of bore 24 during sintering.

The sintering mold is placed into a temperature-controlled, air-circulating oven having a temperature of 370° C. The temperature of the article is monitored, and when it reaches 370° C., the article and mold are immediately taken out of the oven and quenched in ice water. The 370° C. temperature is high enough to assure that the seal reaches its sintering temperature, but not so high as to allow the seal to remain at an elevated temperature any longer than is necessary to achieve sintering, for if the seal is not removed soon after sintering, its surface will oxidize and lose wear-resistance. The fact that the empirical formula of the final product agrees with that of the starting materials indicates that no such decomposition has in fact taken place. The ice water quench is used to achieve a repeatable level of PTFE crystallinity in the seal. Slower cooling (e.g., in air) could be used if the rate of cooling is kept uniform from one batch of seals to the next.

Sintering causes the composition to flow sufficiently to fill groove 20 and thus embed spring 22.

After sintering, the seal has a density of 1.7 gm/ml (in methanol), an empirical formula of $CF_{1.28}$, and a porosity of 0.07 cc/gm.

USE

The operation of the pump in which the seal is used is described in U.S. application Ser. No. 10,686. Spring 22 helps maintain a tight fit between plunger 26 and bore 24.

The seal has been found to be inert to all substances (e.g., solvents) encountered in liquid chromatography and to have significantly greater wear resistance than conventional seals.

OTHER EMBODIMENTS

Other embodiments of the invention will occur to those skilled in the art. For example, although one particularly advantageous method for mixing the polytetrafluoroethylene, graphite fibers and fluorinated graphite into a homogeneous, granular, and fine mixture suitable for manufacturing wear-resistant particles has been disclosed, variations will work. In particular, the methylene chloride may be replaced by other halogenated hydrocarbons having relatively low boiling points, e.g., carbon tetrachloride and Freons. Also, in addition to molding and then sintering the mixture, the mixture can be sintered into stock material, which is later machined to a desired shape.

OTHER INVENTIONS

The wear-resistant seal 10 molded and sintered from the composition of this invention is the subject matter of a commonly assigned patent application of the inventors herein entitled "Wear Resistant Article."

What is claimed is:

1. The method of preparing a composition consisting essentially of a mixture of 74–84% by weight polytetrafluoroethylene, 7–17% graphite fibers and 4–14% fluorinated graphite comprising the steps of:

mixing together 74–84 parts by weight of polytetrafluoroethylene in a chlorinated ethane or methane solvent to form a first slurry, mixing 7–17 parts graphite fibers and 4–14 parts fluorinated graphite in a chlorinated ethane or methane solvent to form a second slurry, mixing said first and second slurries to form a third slurry, and draining said third slurry so as to give the mixture a granular consistency.

2. The method of claim 1 comprising the further steps of:

mixing said drained third slurry in water to form a fourth slurry, draining and drying said fourth slurry, and sintering the resulting composition.

3. The method of claim 2 further comprising passing said dried fourth slurry through one or more sieves prior to said sintering step to prevent caking.

4. The method of claim 2 wherein said chlorinated methane or ethane is methylene chloride.

5. The method of claim 4 wherein said third slurry is drained at room temperature using a vacuum.

6. The method of claim 5 wherein said fourth slurry is dried at about 125° C.

7. The method of claim 2 wherein said first slurry is mixed for about one minute.

8. The method of claim 2 wherein said third slurry is mixed for about 1½ minutes.

9. The method of claim 8 wherein said fourth slurry is mixed by three short high-speed pulses.

10. The method of claim 6 wherein said fourth slurry is dried for about eight hours.

11. The method of claim 10 wherein said sieves constitute a #10 and #14 sieve.

12. The method of claim 1 comprising the further steps of:

mixing said dried third slurry in water to form a fourth slurry, and draining and drying said fourth slurry.

* * * * *